(12) United States Patent
Bortolussi

(10) Patent No.: US 10,495,858 B2
(45) Date of Patent: Dec. 3, 2019

(54) IMAGE-ACQUIRING EQUIPMENT EQUIPPED WITH TELECENTRIC OPTICAL OBJECTIVE WITH PRIMARY CYLINDRICAL LENS

(71) Applicant: IMPRESA INGEGNERIA ITALIA S.R.L., Trieste (IT)

(72) Inventor: Gian Luigi Bortolussi, Trieste (IT)

(73) Assignee: IMPRESA INGEGNERIA ITALIA S.R.L., Trieste (IT)

( * ) Notice: Subject to any disclaimer, the term of this patent is extended or adjusted under 35 U.S.C. 154(b) by 32 days.

(21) Appl. No.: 15/542,544

(22) PCT Filed: Jan. 15, 2016

(86) PCT No.: PCT/IT2016/000010
§ 371 (c)(1),
(2) Date: Jul. 10, 2017

(87) PCT Pub. No.: WO2016/116956
PCT Pub. Date: Jul. 28, 2016

(65) Prior Publication Data
US 2017/0363845 A1   Dec. 21, 2017

(30) Foreign Application Priority Data
Jan. 20, 2015   (IT) ................. TS2015A0001

(51) Int. Cl.
*G02B 13/22*   (2006.01)
*G02B 3/06*   (2006.01)
(Continued)

(52) U.S. Cl.
CPC ............... *G02B 13/22* (2013.01); *G02B 3/06* (2013.01); *G02B 13/0065* (2013.01); *G02B 27/0025* (2013.01); *H04N 5/2256* (2013.01)

(58) Field of Classification Search
None
See application file for complete search history.

(56) References Cited

U.S. PATENT DOCUMENTS 5,057,280 A * 10/1991 Stock .................. G01N 21/783
348/135
5,610,391 A * 3/1997 Ringlien .............. G01B 11/024
250/208.1
(Continued)

*Primary Examiner* — Twyler L Haskins
*Assistant Examiner* — Wesley J Chiu
(74) *Attorney, Agent, or Firm* — Nath, Goldberg & Meyer; Joshua B. Goldberg; Daniel Bissing

(57) ABSTRACT

An image-acquiring equipment with camera with linear sensor is described, having a telecentric optical objective whose main lens 23 is of the cylindrical type, placed in the same way as of the main lens of a known telecentric optics; the lens 23 can be of an a-cylindrical type, with profile computed for removing the cylindrical aberration; the optical assembly 13 for forming a real image 16 on the sensor 26 of the linear camera can be replaced with an optics of the photographic type, obtaining the best possible exploitation of the opening A of the main lens 23, greatly simplifying the construction of the telecentric optics; the image-acquiring equipment comprises a telecentric optics 27, a lamp 34 and a camera 24 of the linear or array type, and is pertaining to a viewing system for dimensional, geometric, or metrological checks.

12 Claims, 6 Drawing Sheets

(51) Int. Cl.
*G02B 13/00* (2006.01)
*G02B 27/00* (2006.01)
*H04N 5/225* (2006.01)

(56) References Cited

U.S. PATENT DOCUMENTS

| | | | | |
|---|---|---|---|---|
| 5,748,356 A | * | 5/1998 | Park | G02B 13/0005 347/259 |
| 6,256,095 B1 | * | 7/2001 | Ringlien | G01N 21/9054 356/239.4 |
| 2002/0186368 A1 | * | 12/2002 | Rosengaus | G01N 21/9501 356/237.2 |
| 2003/0156303 A1 | * | 8/2003 | Schnee | G06K 9/2009 358/509 |
| 2004/0021053 A1 | * | 2/2004 | Nielson | G01B 11/24 250/201.2 |
| 2008/0094616 A1 | * | 4/2008 | Tanaka | G01N 21/8803 356/237.2 |
| 2010/0265554 A1 | * | 10/2010 | Shirakura | G03H 1/04 359/32 |
| 2011/0063615 A1 | * | 3/2011 | Shimbo | G01J 3/02 356/326 |
| 2014/0098220 A1 | * | 4/2014 | Nunnink | H04N 5/232 348/135 |

* cited by examiner

IMAGE-ACQUIRING EQUIPMENT EQUIPPED WITH TELECENTRIC OPTICAL OBJECTIVE WITH PRIMARY CYLINDRICAL LENS

This is a National Phase Application filed under 35 U.S.C. 371 as a national stage of PCT/IT2016/000010, filed Jan. 15, 2016, an application claiming the benefit of Italian Application No. TS2015A000001, filed Jan. 20, 2015, the content of each of which is hereby incorporated by reference in its entirety.

The present invention refers to an image-acquiring equipment equipped with a telecentric optical objective with a primary cylindrical lens.

In particular, the present invention refers to a new type of telecentric optical objective, with main lens composed of a simple or composite cylindrical lens, which, together with a series of technical arrangements, is suitable for building image-acquiring systems based on the use of a linear camera.

As known in the art in this field, telecentric optics are objectives capable of forming, on the acquiring sensor of a camera, a real image almost lacking the perspective effect, as if its viewing point were placed at infinite. In this way, the sizes of an object appear, through the telecentric optics, almost constant when the object shooting distance changes, at least in the range of distances given by the field depth of the telecentric optics itself.

Therefore, the main field of application of the invention are the viewing systems based on the use of linear cameras, to perform geometric check of shape and sizes through "contactless" measures made with image processing techniques.

One of the limits of the known art is given by the high costs and the difficulty of making the front, or main lens for current telecentric optics, which, for such reasons, seldom exceeds a diameter of 300 mm. The invention allows greatly exceeding such construction limit, since working of cylindrical refractive elements allows obtaining much bigger sizes, even greater than 2000 mm. Therefore, the found optical combination can be applied in all those cases in which the use of a telecentric optics is advisable, but cannot be enacted since the field of measure has greater sizes than 300 mm.

In the majority of cases, telecentric optics are made of a dioptric system, namely a system composed only of refractive surface or spherical lenses. The classical scheme of telecentric optics can be found in FIG. 1 of patent U.S. Pat. No. 6,324,016, shown as an approximation in FIG. 1 of the present description with new references. In the diagram of FIG. 1, it can be seen how, due to the opaque diaphragm 20 with opening 21, inserted in the focal point F of the main lens 12, only rays 18 and 19, respectively parallel and almost parallel to the optical axis AO, manage to cross the opening 21 getting to make the real image 16 of the viewed object 15. Instead, the non-parallel rays 17 to the optical axis AO are blocked by the diaphragm 20. The term "real image" means an image formed of the intersection point of the rays according to the geometric optics laws. Telecentric optics are industrially produced, even by very well known companies, such as Carl Zeiss; they are known in the technical world as particular objectives, characterized by forming a real image of the viewed object, in which the perspective parallax is practically cancelled: as a simplification, it can be stated that telecentric optics provide a view of a certain object as if the viewing point is placed at an infinite distance from the object itself.

From the constructive point of view, telecentric optics are composed of a main, converging lens 12, often composed of many simple lenses to form an achromatic or apochromatic assembly, placed in front of the viewed object, and of an optical assembly 13 for forming the real image which, in the construction practice, is always integrated in the body of the telecentric optics 10 itself. This implies construction sizes which are much bigger than those of a traditional optics, with the same viewed field. The working distance WD is generally small and in the majority of cases is of the same order of magnitude of the diameter of the front lens.

Arrangements are known for decreasing the overall sizes of a telecentric optics, in particular the use of mirrors to bend the optical path and make the resulting overall sizes smaller. Such arrangements are part of the invention disclosed in the above patent U.S. Pat. No. 6,324,016. Catadioptric telecentric solutions are also known, in which, in place of the main refractive lens, a parabolic mirror is used. Such telecentric optics have similar diagrams to those known for making astronomy telescopes. A better embodiment of a catadioptric telecentric system is obtained by using a out-of-axis parabolic mirror. Catadioptric telecentric embodiments have not become a construction practice for viewing systems, so that available telecentric optics are practically all of the dioptric type.

In general, in the image forming point of a telecentric optics, the sensor 14 of a camera 11 is placed, for acquiring the digital image of the object 15 placed in the viewed field. The property of producing images almost fully lacking the perspective effect has enabled the telecentric optics to be used in artificial viewing system for geometric and dimensional checks, thereby obtaining contactless metrological control systems.

Based on optical physics laws, it is clear that, in the telecentric optics, the size A of the main lens 12 (or of the mirror in a catadioptric combination) must be greater than or at least equal to the size of the object whose image has to be acquired. Currently, telecentric optics (Zeiss) are marketed with a viewed field up to 240×240 mm which, if coupled with linear cameras, allow acquiring surfaces about 300 mm wide. Even if it is possible to obtain telecentric embodiments with a viewed field, and therefore diameter of the main lens, bigger than 300 mm, its construction costs are so high that they become greater than those of the other measuring systems, for example mechanical feelers. A further limitation to the construction of big telecentric optics is given by the small sizes of optical glasses for normally available refractive components: for example, blanks made of optical boron-silicate glass Schott BK7 with a side longer than 500 mm are practically impossible to find on the market.

Telecentric optical embodiments are known in which the main lens is a Fresnel lens (company Light Work LCC) which have a viewed field of 16", namely 400 mm; the quality of such optics, according to the manufacturer, is insufficient for metrological checks. The optical physics constraint on the minimum size of the main lens determines the main construction limit of known telecentric optics, which is translated in the unavailability, apart from costly custom embodiments, of such objectives for viewed fields from 300 mm on.

Another limit of known prior art is given by the integration of the optical assembly for forming the real image 13 with the telecentric objective 10 body. Such integration implies a fixed magnification, which cannot be modified, given by the ratio between the width d of the real image produced by the telecentric optics and the size D of the viewed field. For example, if a telecentric objective has a viewed field D equal to 120 mm and produces on the focal plane a real image of 12 mm, it will be characterized in having a 0.1× magnification. In order to adequately exploit such telecentric optics, it is necessary to couple it with a camera with an image-acquiring sensor with a diagonal of 12 mm: it could be not possible to find an efficient coupling, either due to the lack of dimensional correspondence of the sensor of a camera with suitable technical features for the provided application, or due to the performance inadequacy of the camera, though equipped with sensor of a suitable size. The presence on the market of a plurality of cameras with the widest range of sensor formats compels the manufacturers of telecentric optics to have a very wide catalogue available in order to best adapt the different openings (viewed field which can theoretically be reached) to the very many formats of image sensors. For example, in order to form a complete catalogue of telecentric optics with 10 openings of a viewed field to be coupled with 20 formats of image sensors, the catalogue will have to provide 10×20=200 different product codes.

In order to solve the prior art inconveniences and to obtain these and further objects and advantages, the Applicant has studied, experimented and made the present invention.

The present invention is disclosed and characterized in its independent claims.

Dependent claims disclose other features or variations of the present invention.

It is intended that all enclosed claims are an integral part of the present description.

In order to overcome known limitations to the manufacture of big-sized lenses, and therefore the lack of availability of telecentric optics whose opening A is greater than 300 mm, the Applicant has devised a new optical telecentric scheme for image sensors of the linear type, shown in FIG. 2, wherein the main lens 23 is of the cylindrical type.

In such optical scheme, the lens 23 must be placed so that its optical axis is orthogonally incident on the image sensor 26 in its central point; moreover, the cylindrical axis AC of the lens must be orthogonally arranged to the linear image sensor 26; finally, its focal line LF must fall next to the opening 21 of the diaphragm 20.

As known, an image acquisition with a linear camera occurs by creating a relative scanning movement between object (or piece) and camera, directed along the orthogonal direction to the linear sensor. Therefore, the scanning motion occurs along axis Y, in parallel with the cylindrical axis AC of the lens.

The optical scheme with cylindrical lens of the invention is strictly telecentric only along the axis given by the linear sensor, therefore in parallel with axis X, with reference to FIGS. 2, 4, 5 and 6. I spit of this, it can be demonstrated that, if the image of a certain object is acquired with a linear camera through the optics shown in FIG. 2, through a scanning with motion parallel to axis Y, said image results free from perspective effects. Such statement is demonstrated by the following empirical demonstration.

Take into account a pair of objects or pieces 28 and 29 like in FIG. 3. If, through a sensor array apparatus equipped with a traditional, not telecentric optics, pieces 28 and 29 are photographed resting on plane X-Y, from a high point on their vertical line, with the optical shooting axis parallel to said vertical line, their obtained image is similar to the one shown in FIG. 4. In such image, equipped with a perspective effect, the internal walls of the holes 30 and the side wall 31 of the piece 29 are partially visible. Moreover, due to the different thicknesses S1 and S2 of the pieces 28 and 29, the visual measures MVL1 and MVL2 in the image shown in FIG. 4, pertaining to sizes with the same measure L, are different, and in particular MVL2>MVL1.

If, in order to acquire the image of the pieces 28 and 29, a camera is used equipped with a linear sensor, always equipped with a common optics, given a scanning motion parallel to axis Y, the image shown in FIG. 5 is obtained. It can be observed that said image is lacking perspective effects along the scanning direction Y, in particular MVL2=MVL1: this fact is always true for all images obtained through a linear scanning, provided that this scanning occurs orthogonally to the line located by the linear sensor and on a plane orthogonal to the optical axis.

Now, in order to cancel the residual perspective effect along axis X only, shown in FIG. 5, it is enough to provide a cylindrical lens 23 arranged as in FIG. 2; in detail, the lens will have to be arranged with its axis AC orthogonal to the line given by the linear sensor. In this way, the telecentric optics 27 of the invention produces an image lacking the perspective effect, both along X and along Y. The major difference with respect to traditional telecentric objectives is that they produce an image instantaneously, without the need of a scanning which brings about the formation of an image with a succession of temporally separated acquisition events.

A cylindrical lens like 23 can be particularly thin along direction Y, for example having a thickness LL included between 1 and 60 mm: in this way, the blank of a lens of this type can be easily obtained from a commercial glass slab of the same thickness, with a good optical quality, through a water jet cutting. Since slabs can be found on the market which are made of crown glass, a glass with low chromatic dispersion, whose sizes are about 6000×3000 mm, blanks of cylindrical lenses having many meters of opening can be easily produced. Even if commercially available glasses in slabs, for example, but not exclusively: Schott BOROFLOAT® 33, Schott SUPREMAX® 33, Corning PYREX®, etc., are not classified as optical glasses in a strict sense, they anyway have optical properties such as transparency, refraction index, etc. which are very good and more than enough to make the telecentric optics of the invention.

According to an embodiment of the telecentric optics 27 of the invention, in order to solve the problem that the cylindrical lenses are affected by cylindrical aberration, in the same way in which spherical lenses are affected by a spherical aberration, a variation of the lens 23 is advantageously provided, in which one of the surfaces is shaped with an adequate "a-cylindrical" profile (FIG. 9). The a-cylindrical profile computed by the Applicant has proven excellent both under "ray tracing" simulations, and in two produced prototypes: they are two cylindrical lenses with an opening of 500 mm and a focus of 1000 mm, which, in performed tests, have resulted practically lacking a cylindrical aberration.

As known in the art, cylindrical lenses, namely lenses delimited by cylindrical surfaces, has a cylindrical aberration which consists in the dispersion, around the focal point, of image forming points of a beam of rays which are incident onto the lens in parallel with its optical axis. Such aberration is the equivalent of the spherical aberration of spherical lenses, namely lenses delimited by spherical surfaces. The geometric profile which allows removing the cylindrical aberration can be computed with known numeric computation programs.

An advantageous solution is given by the adoption, for the main lens 23, of a bi-convex profile (FIG. 9) wherein the internal profile 40 is a-cylindrical, while the external profile 41 is of the cylindrical type, with such a radius as to maximize the distortion of the telecentric objective 27. A further improvement is given by the adoption of an a-cylindrical profile also for the external profile 41, computed so that the main lens 23 has a geometric distortion equal and contrary to that of the optical assembly for forming the real image 33. In this way, it is possible to obtain a telecentric optics which, in addition to remove the perspective parallax, is also lacking a geometric distortion, with great advantages in contactless optical check applications.

A further embodiment of the present invention can be obtained by making the cylindrical lens 23 as composition of two or more elements to form an optical assembly of the achromatic or apochromatic type.

A rather advantageous embodiment of the telecentric objective 27 of the invention provides for the replacement of the optical assembly 13 for forming the real image 16, with a suitably chosen photographic objective 33, of the known type, which performs the same function. To introduce such variation, in the optical scheme of the invention, a mechanical fitting element 32 must be added between the photographic objective and the body of the camera 25.

In such variation, the adjustable iris of the photographic optics 33 replaces the diaphragm 20 with opening 21 of the first above described embodiment, thereby obtaining a construction simplification.

By suitably choosing the focus of the objective 33, the opening A of the main lens can be adapted to different formats of image-acquiring sensors of the cameras. By introducing the interchangeability of the optical assembly 13 for forming images with the insertion of photographic objectives, the number of telecentric product codes for a given size of the viewed field is strongly reduced, thereby exceeding the limit of proliferation of prior art product codes.

A further improvement can be obtained by inserting as photographic optics 33 for forming the real image 16, a zoom objective. It is thereby possible to optimally adapt a plurality of formats of image sensor 26, either at the maximum opening A of the front lens 23, or with a desired viewing field (lower than opening A).

The advantages, with respect to the prior art, of using a commercial photographic optics 33 as assembly for forming the real image, are multiple and are summarized herein below:
- possibility of adapting a plurality of cameras with different formats of image sensors at the opening A of the main lens 23, or of obtaining a desired viewed field smaller than A, maximizing the resolution of the acquired image;
- possibility of easily regulating the focusing;
- possibility of regulating the field depth by acting on the iris of the optics 33;
- possibility of having a single item code for a given opening of the telecentric optics of the invention.

These and other features of the present invention will clearly appear form the following description of some embodiments thereof, provided as a non-limiting example, with reference to the enclosed drawings, in which.

Figure 6:
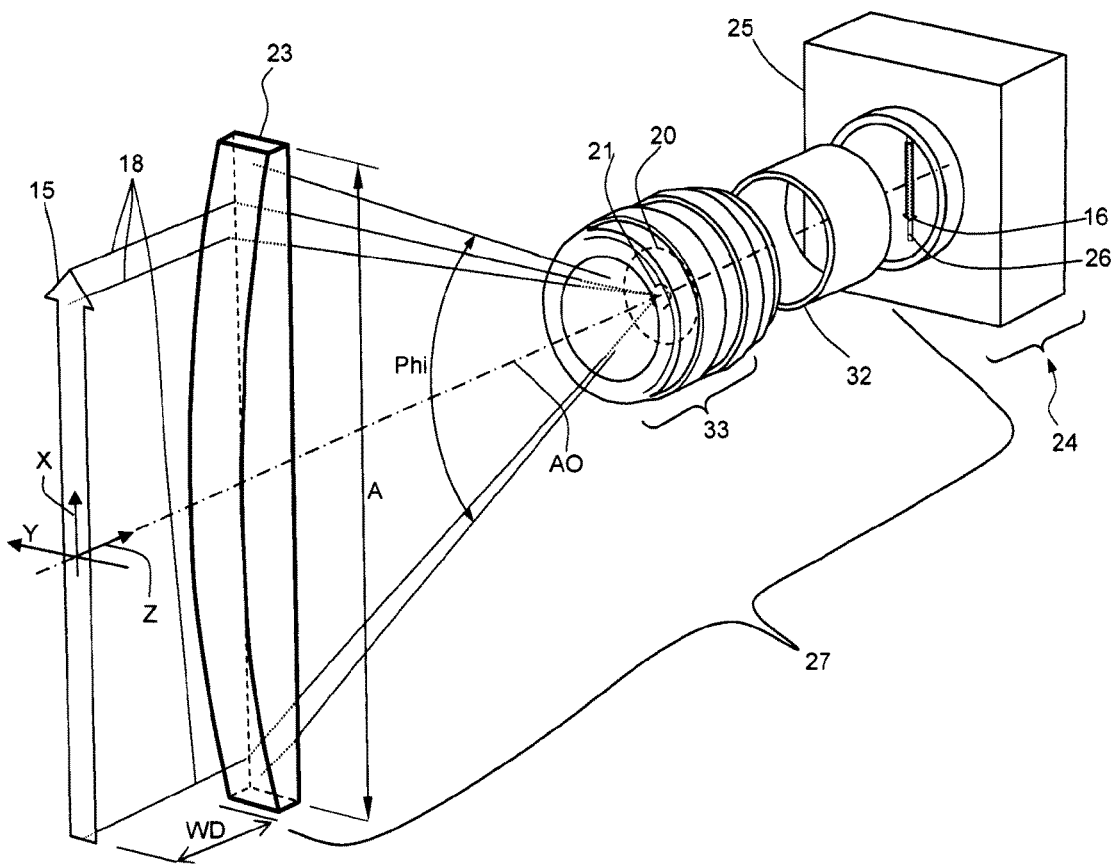
Figure 7:
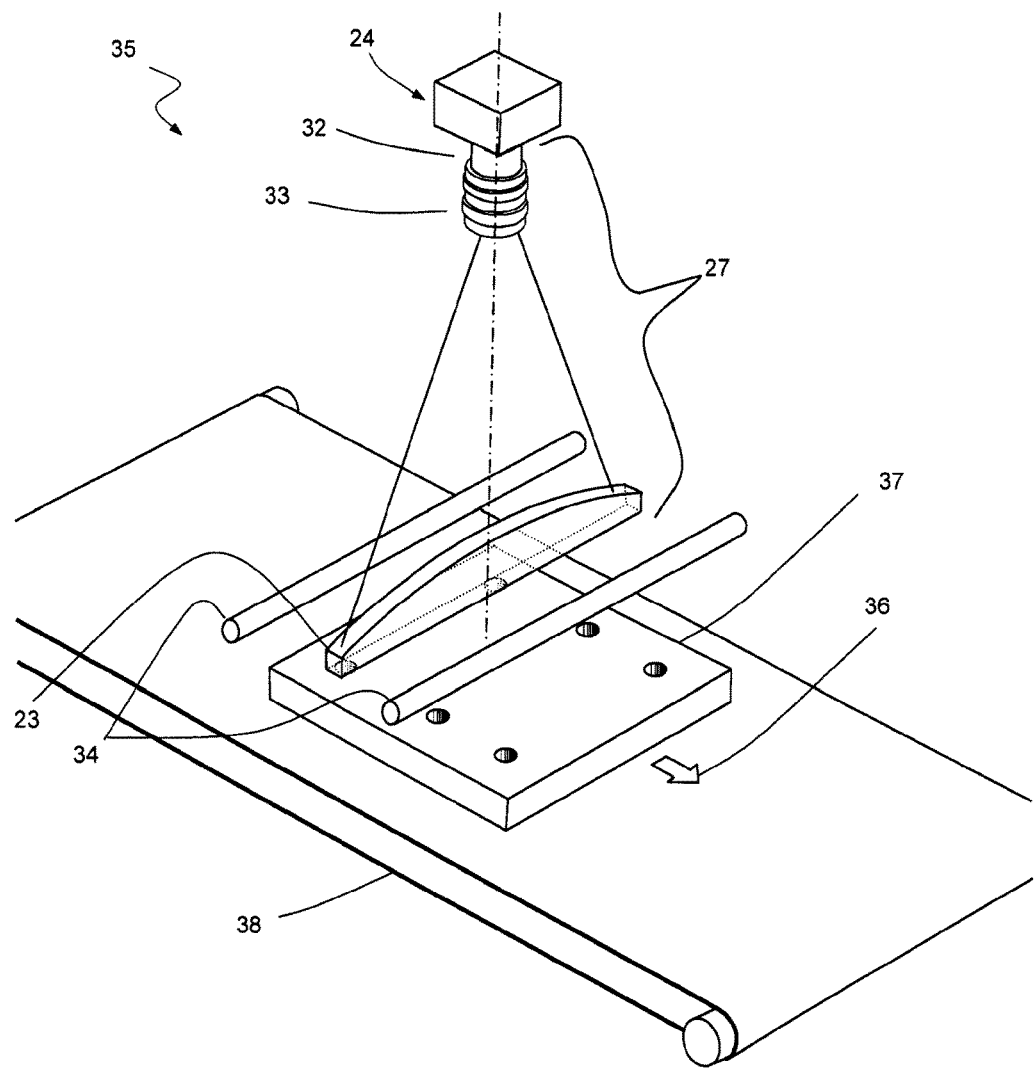
Figure 8:
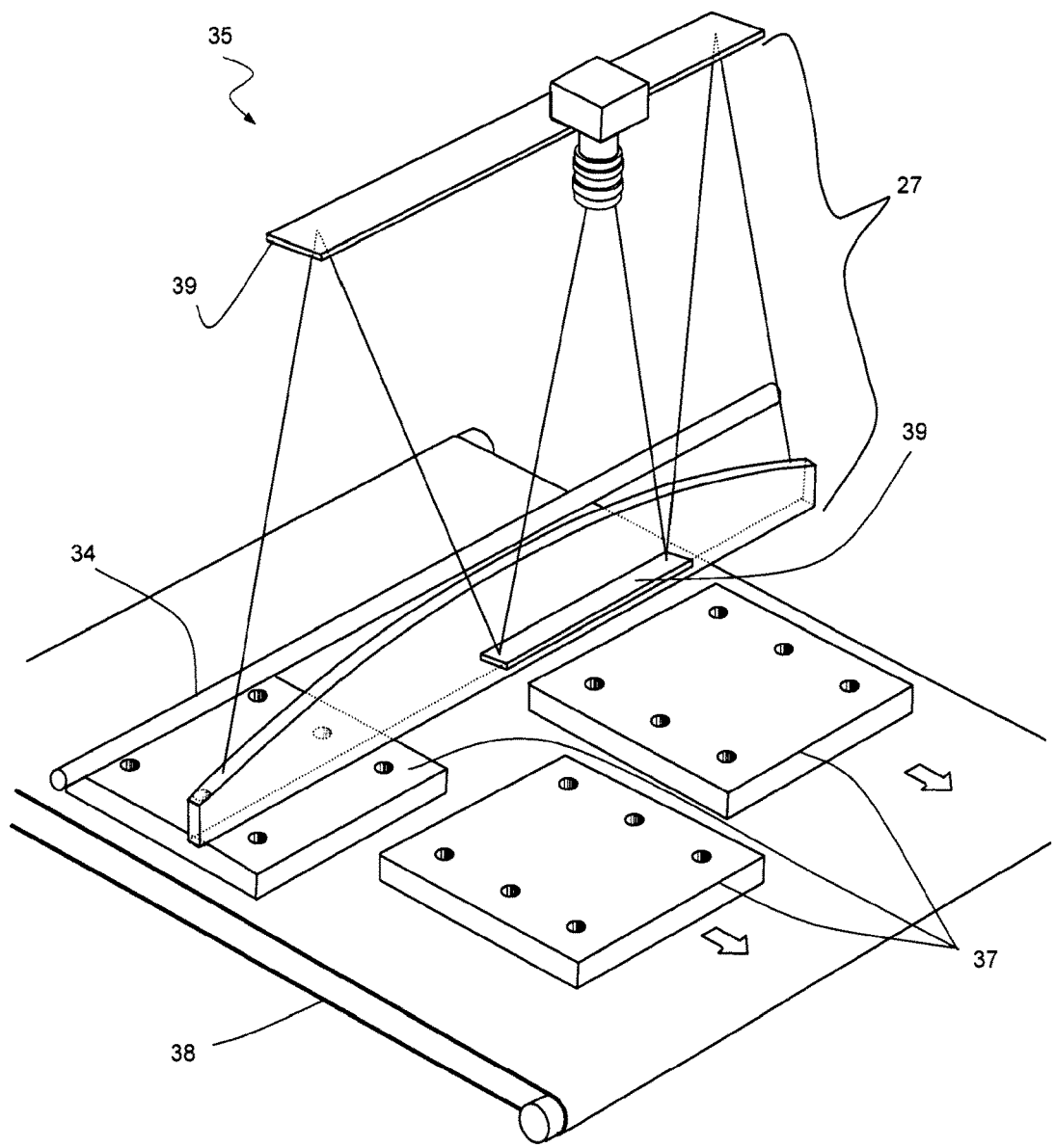
Figure 9:
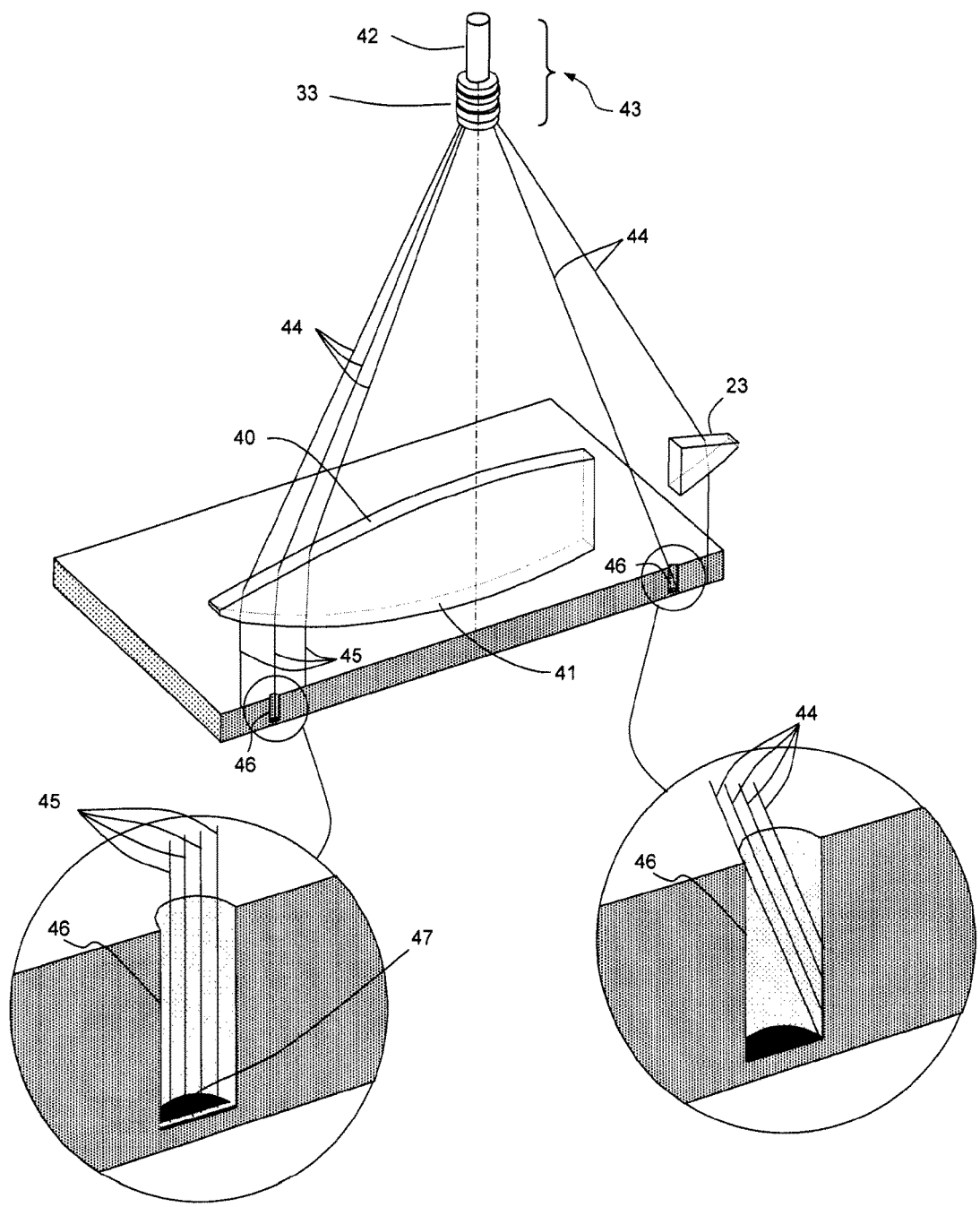

FIG. 6 shows a further embodiment of the invention, comprising a photographic optics 33 of a known type as assembly for forming the real image 16 on the sensor 26 of the camera 24. The diagram comprises an adaptor fitting between connection of the optics 33 and the body of the camera 25;

FIG. 7 shows, as a non-limiting example, a generic apparatus for acquiring and processing images, known in the art as "viewing system", which includes the invention, exploiting the property of producing images which are almost lacking a perspective parallax, to perform geometric, dimensional and metrological checks;

FIG. 8 shows, as a non-limiting example, a generic image acquiring and processing apparatus with wide viewed field. In such diagram, due mirrors with first surface have been inserted to fold the optical path in three sections and widely contain the size of the equipment comprising the invention; and FIG. 9 shows, as a non-limiting example, an application of the optics of the invention as system for generating unidimensional collimated beams, suitable to be used in a 3D image-acquiring solution, with better performance with respect to known systems of this type.

The terms "mirrors with first surface" mean mirrors with a reflecting surface placed frontally, so that incident and reflected rays do not cross the glass which composes the mirror body.

It must be noted that in all Figures elements for supporting and bearing the drawn components have been omitted, both for more clarity of the drawings, and because the containing and supporting elements are not innovations with respect to the invention. It is anyway intended that supporting and containing elements are necessary for making the invention in practice, and that any skilled person in this field, with the benefit of all information included in the present description, would be able to practice the invention.

It is clear that, to the telecentric optics 27 with cylindrical lens 23 described here, modifications and/or additions of parts could be made, without thereby departing from the scope of the present invention.

It is also clear that, though the present invention has been described with reference to a specific example, a skilled person in this field will surely be able to make many other equivalent embodiments of telecentric optics having the features expressed in the claims and therefore all falling within the scope defined thereby.

FIG. 7 schematically shows a piece of equipment 35 for acquiring images of various types of pieces, placed in an industrial mass production environment. The equipment comprises the telecentric optics 27 of the invention, a lighting system 34, a belt-type transporting system 38, and a camera 24. Should the cylindrical lens 23 be of the simple type, the lighting 34 could be monochromatic of with narrow spectrum band, for example 40 nm, to obtain images lacking chromaticism and therefore sharper. Therefore, it will be advantageous to use illuminators with LED sources and with the emission of a single color, or based on fluorescent tubes with almost monochromatic emission (sodium, argon, neon, etc.). The belt brings the pieces 37 to move. Next to a certain advancement pitch of the belt 38, an encoder coupled therewith through a pulley (not shown) generates a train of pulses which drives the acquisition of as many image lines to the camera 24. The camera signal, containing the image lines shaped as a string of binary words (Byte), is taken to the RAM memory of a processor, through a communication port. The set of lines forms the digital image of the object 27. In such image the object appears lacking a parallax: therefore, by processing the image itself, it is possible to extract a series of measures of the piece 37, such as for example: number and position of the holes, diameter of each hole, piece sizes.

Figure 1:
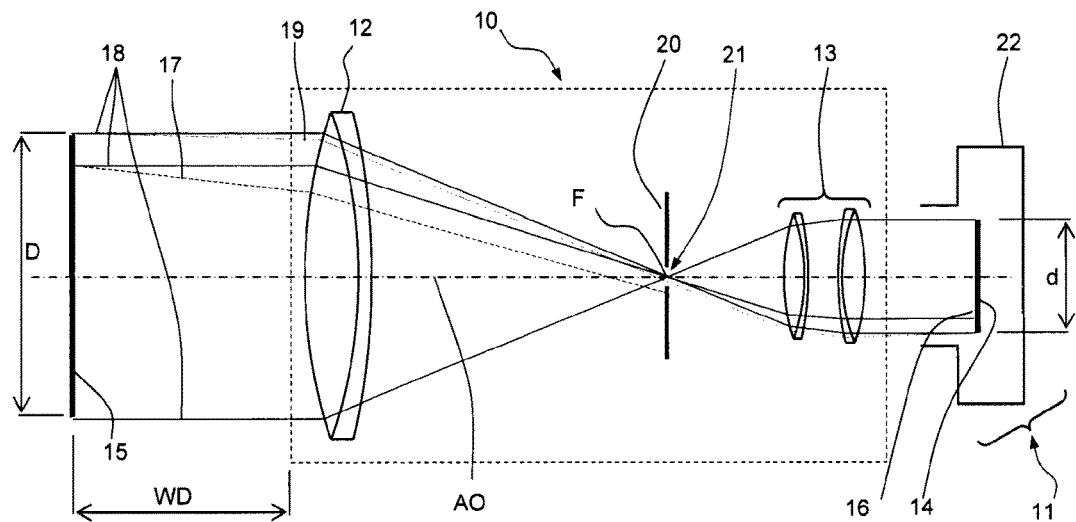
FIG. 1 is a schematic representation of a prior art telecentric objective.
Figure 2:
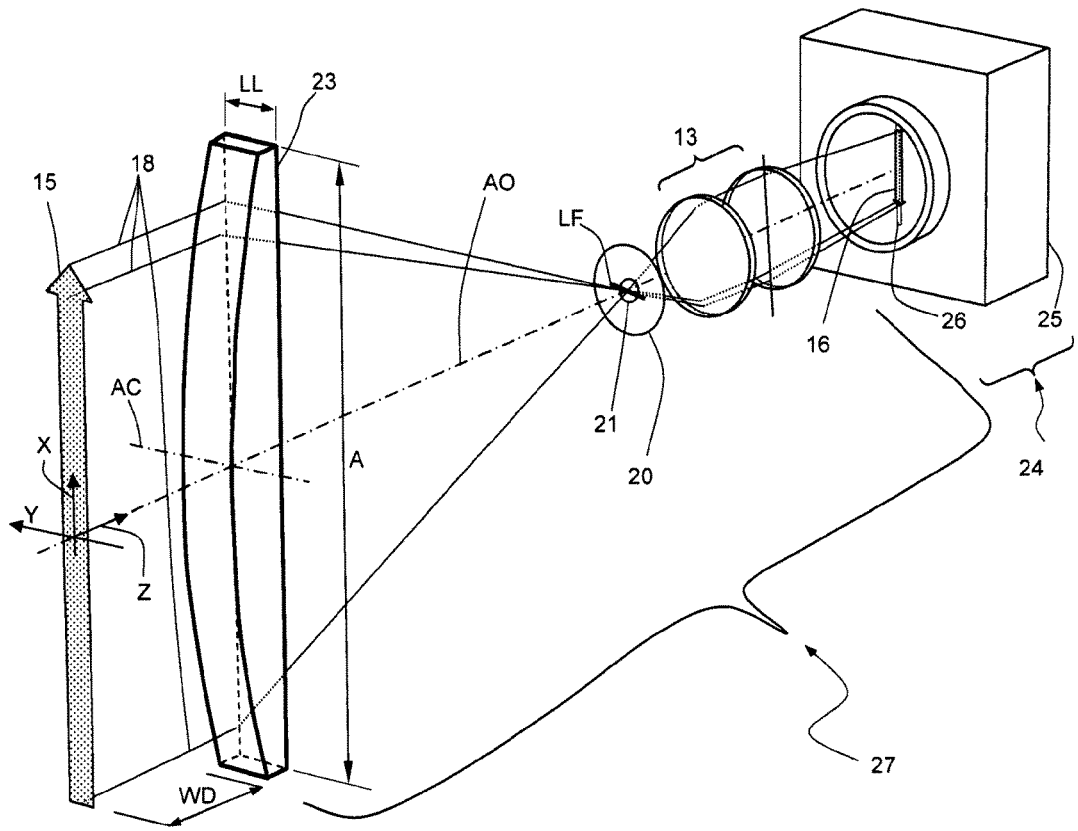
FIG. 2 shows the main lens 23 of a cylindrical type according to the present invention in compliance with a first embodiment. Such embodiment provides that the cylindrical lens has an a-cylindrical profile for removing the cylindrical aberration; moreover, the lens 23 is composed of many elements adapted to reduce other forms of aberration, for example the chromatic aberration.
Figure 3:
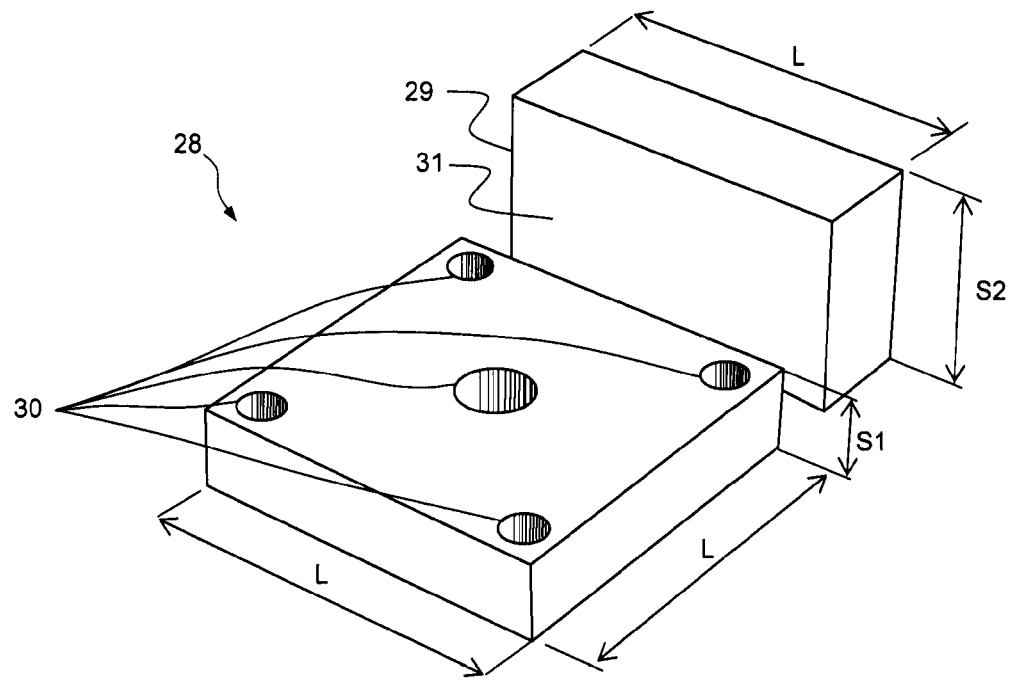
FIGS. 3, 4 and 5 show the operation of the invention as previously described.
Figure 4:
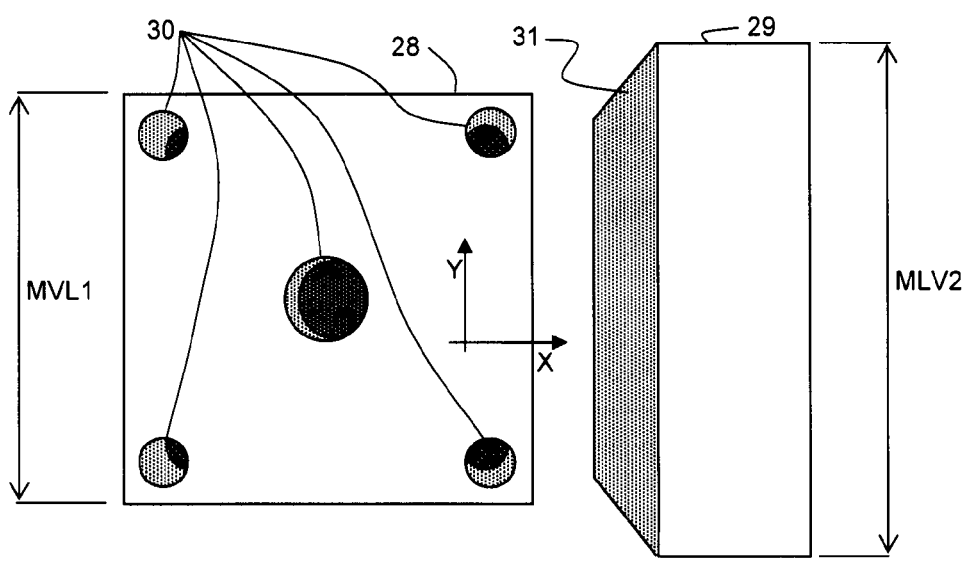
Figure 5:
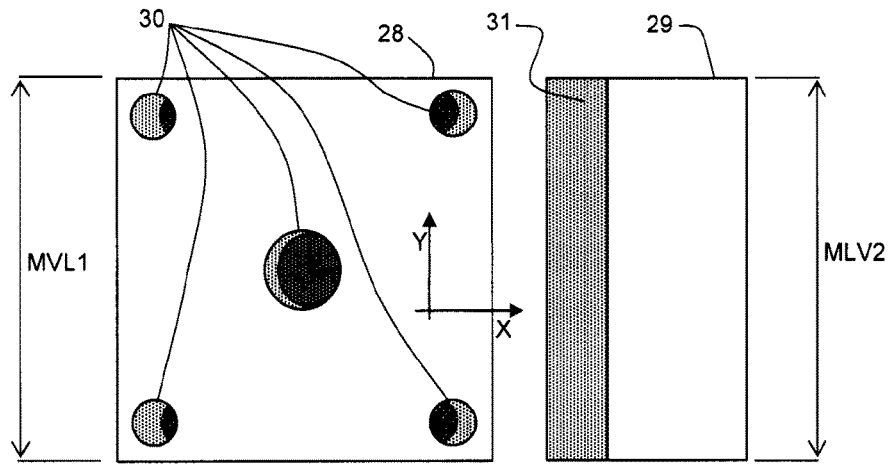

The use of the cylindrical lens 23 in making the invention is advantageous with respect to the prior art also in terms of reduction of the volume of the resulting telecentric optics, in particular along direction Y. The relative easiness with which it is possible to make a big-format cylindrical lens, for example with opening A equal to 1 meter, anyway makes the invention very big along axis Z, parallel to the optical axis in the diagram of FIG. 5.

In order to reduce the size along axis Z, plane mirrors can be used to fold the optical path a certain number of times, as shown in FIG. 8. For example, by using two mirrors, it can be possible to divide the optical path into three sections, strongly reducing the overall space size of the invention. Depending on the Applicant's experience, it is advisable to use first surface mirrors, to avoid forming halos and double images; moreover, it is advisable not to introduce more than three mirrors to prevent the degrading/attenuation of the image quality of the object which has to be acquired.

With reference to FIG. 9, the new optics shown therein can be used to generate perfectly collimated luminous lines, namely lines which are composed of a propagation of parallel light rays.

A known technique for 3D mapping images is based on the use of a generator of a luminous line, typically laser, and a camera which shoots, from a certain angle, the luminous line projected on the object to be 3D-mapped. Typically, the optical axis of the luminous line is normally incident on the object plane, while the optical axis of the 3D profile-acquiring camera is slanted by 20-40 degrees with respect to the normal line to such plane. In this case, an important prior art limit is the divergence of the luminous rays which form the luminous line. Due to such divergence, light is not able to reach the bottom of blind recesses 46 placed outside the optical axis; when moving away from the optical axis of the luminous line, luminous rays can reach the bottom of recesses (for example holes) less and less deep. FIG. 9 shows how the use of the optics of the invention allows obtaining the collimation of the luminous line in rays 45 parallel to the optical axis. Such rays can reach the bottom of a blind hole 46, forming the luminous line 47, independently from the hole depth and independently from its distance from the optical axis. On the other hand, it can be seen how, without the lens 23 of the invention, the divergent rays 44 produced by the luminous line generator 43 (composed of a light source 42 and of the optical assembly 33) are not able to reach the bottom of a similar blind hole.

If, in order to shoot the luminous line projected by the object to be 3D-mapped, an array camera is used, coupled with a further telecentric optics of the invention, blind recesses can also be mapped which have a high depth with respect to their diameter, for example holes with a diameter of 3 mm and a depth of 15 mm, which cannot be generally mapped with traditional 3D scanners. Therefore, the invention is capable of greatly improving known 3D scanning systems.

The invention claimed is:

1. Image-acquiring equipment adapted to acquire an image of an object (15, 37) lacking perspective parallax, said equipment comprising:
    a lighting apparatus (34);
    a handling system (38) of the object (15, 37);
    characterized in that it further comprises:
    a linear camera (24) equipped with a linear image sensor (26);
    a telecentric optical objective (27) composed of:
        an optical assembly (13) for forming a real image (16) of the object (15, 37) or a photographic objective (33) for forming a real image (16) of the object (15, 37);
        a diaphragm (20) having an opening (21); and
        a main lens composed of a cylindrical lens (23), placed between the diaphragm (20) and the object (15, 37) so that:
    an optical axis (AO) of the cylindrical lens (23), passing through the opening (21) of the diaphragm (20) and the optical assembly (13) or the photographic objective (33), orthogonally intersects a plane of the linear image sensor (26) in its central point;
    a cylindrical axis (AC) of the cylindrical lens (23) is orthogonal to the optical axis (AO) which is also the main axis of the linear image sensor (26)
    wherein the optical assembly is placed between the linear camera (24) and the object (15, 37), the diaphragm (20) being located at an end of the optical assembly (13) closest to the object (15, 37);
    wherein the photographic objective (33) is placed between the linear camera (24) and the object (15, 37), the diaphragm (20) being located within the photographic objective (33);
    wherein the opening (21) of the diaphragm (20) is located on a focal line of the cylindrical lens (23); and
    wherein said cylindrical lens (23) has at least one optical separating surface with an a-cylindrical shape, namely a shape different from the shape of a cylindrical surface with constant radius, computed in order to remove a cylindrical aberration of said lens (23).

2. The equipment according to claim 1, characterized in that said cylindrical lens (23) is composed of two or more cylindrical lenses to form an achromatic or apochromatic assembly.

3. The equipment according to claim 1, characterized in that the optical assembly (13) for forming the real image (16) is composed of the photographic objective (33), which is applied to a body (25) of the linear camera (24) through a fitting (32), whose focus is chosen so that the resulting viewing angle (Phi) for the format of the linear image sensor (26) covers at least 80% of an opening (A) of the main lens (23), wherein the photographic objective has a fixed focus.

4. The equipment according to claim 1, characterized in that the optical assembly (13) for forming the real image (16) is composed of the photographic objective, which is applied to a body (25) of the linear camera (24) through a fitting (32), wherein the range of focal lengths is chosen so that a viewing angle (Phi) which covers 100% of an opening (A) of the main lens is obtained, wherein the photographic objective has a variable focus (zoom).

5. The equipment according to claim 1, characterized in that the lighting apparatus (34) is made with luminous sources with narrow spectrum band.

6. The equipment according to claim 5, characterized in that the lighting apparatus (34) is made with LED sources with single color.

7. The equipment according to claim 1, characterized in that it has a viewing field greater than 300 mm.

8. The equipment according to claim 1, characterized in that it comprises at least one mirror (39) adapted to reduce the overall sizes of the equipment by a factor equal to the number of used mirrors plus 1.

9. The equipment according to claim 8, characterized in that the mirrors (39) are of a type with first surface.

10. The equipment according to claim 1, wherein a length of the opening is defined by a width of the diaphragm.

11. Image-acquiring equipment adapted to acquire an image of an objects (15, 37) lacking perspective parallax, said equipment comprising:
a lighting apparatus (34);
a handling system (38) of the object (15, 37);
characterized in that it further comprises:
a linear camera (24) equipped with a linear image sensor (26);
a telecentric optical objective (27) composed of:
an optical assembly (13) for forming a real image (16) of the object (15, 37) or a photographic objective (33) for forming a real image (16) of the object (15, 37);
a diaphragm (20) having an opening (21); and
a main lens composed of a cylindrical lens (23), placed between the diaphragm (20) and the object (15, 37) so that:
an optical axis (AO) of the cylindrical lens (23), passing through the opening (21) of the diaphragm (20) and the optical assembly (13) or the photographic objective (33), orthogonally intersects a plane of the linear image sensor (26) in its central point;
a cylindrical axis (AC) of the cylindrical lens (23) is orthogonal to the optical axis (AO) which is also the main axis of the linear image sensor (26)
wherein the optical assembly is placed between the linear camera (24) and the object (15, 37), the diaphragm (20) being located at an end of the optical assembly (13) closest to the object (15, 37);
wherein the photographic objective (33) is placed between the linear camera (24) and the object (15, 37), the diaphragm (20) being located within the photographic objective (33);
wherein the opening (21) of the diaphragm (20) is located on a focal line of the cylindrical lens (23); and
wherein the cylindrical lens being of a bi-convex profile, wherein the internal profile of the cylindrical lens has an a-cylindrical shape, namely a shape different from the shape of a cylindrical surface with constant radius, while the external profile of the cylindrical lens is cylindrical, with such a radius as to maximize the distortion of the telecentric optical objective, so that the cylindrical axis of the cylindrical lens is orthogonal to the optical axis.

12. The equipment according to claim 11, characterized in that said external profile (41) also has an a-cylindrical shape, and is computed so that the cylindrical lens (23) has a geometric distortion equal and contrary to a geometric distortion of the photographic assembly (33) for forming the real image.

* * * * *